March 24, 1964  H. HIEKEN ETAL  3,126,211
INFORMATION TRANSMISSION
Filed April 14, 1959

INVENTORS
HARVEY HIEKEN
MELVYN M. MARCUS
BY Ezekiel Wolf, Wolf + Greenfield
ATTORNEY

United States Patent Office 3,126,211
Patented Mar. 24, 1964

3,126,211
INFORMATION TRANSMISSION
Harvey Hieken, University City, Mo., and Melvyn M. Marcus, 8321 Kingsbury Blvd., Clayton 5, Mo.; said Hieken assignor to said Marcus
Filed Apr. 14, 1959, Ser. No. 806,277
1 Claim. (Cl. 283—6)

The present invention relates in general to methods and means for transmitting confidential information and more particularly concerns novel methods and means for paying by check.

In recent years, the number of checks circulated through the mail has increased considerably to account in part for the increased volume of mail. It is evident that even slight savings in volume and weight per unit piece of mail would help expedite the flow of mail. Moreover, rapid and automatic methods for preparing material for mailing is of great economic advantage. Consequently, it is not surprising that automatic postage marking machines, envelope stuffers, folders, sealers and similar apparatus have come into great use.

In an effort to minimize the weight and volume of individual mailed pieces, efforts have been directed toward using a single sheet of paper to function as both envelope and message carrier. The V-mail letter assembly of World War II and the present day foreign air letters are examples.

Similar techniques have been applied in connection with combined check and envelope assemblies and unitary sheets for mailing statements. Representative examples are disclosed in Patents Nos. 2,831,707 and 1,960,054. However, these assemblies are disadvantageous because of the folding operations required. When performed manually, the operations are time consuming. To perform them automatically requires relatively complex machinery. Moreover, the arrangement of flaps adds to the bulk of the finished mailable item.

The present invention contemplates and has as an important object the provision of a method and means for conveying information through the mail which preserves the confidential nature of the transmitted message, minimizes the weight and volume of the mailed item, is relatively low in cost and requires a minimum number of steps to prepare the mailed item, which steps may be practiced automatically with relatively simple machinery.

It is a more specific object of the invention to achieve the preceding objects in connection with mailing dividend checks, statements, invoices, premium notices, private correspondence, greeting cards, telegrams, money orders and for numerous other uses where it is desired to transmit certain information in confidence to a prescribed addressee.

According to the invention, a first sheet bears indicia thereon indicative of the addressee and the confidential information. A thin opaque sheet of material is strippably secured to the card so as to cover the confidential information while exposing the information designating the intended recipient thereof. By strippably securing, it is meant that a secure bond is effected between the opaque sheet and the message sheet, but that the opaque material may be easily peeled from the card by the designated recipient of the confidential information without affecting the interpretability of the confidential information.

Numerous other features, objects and advantages of the invention will become apparent from the following specification when read in connection with the accompanying drawing in which.

Figure 1:
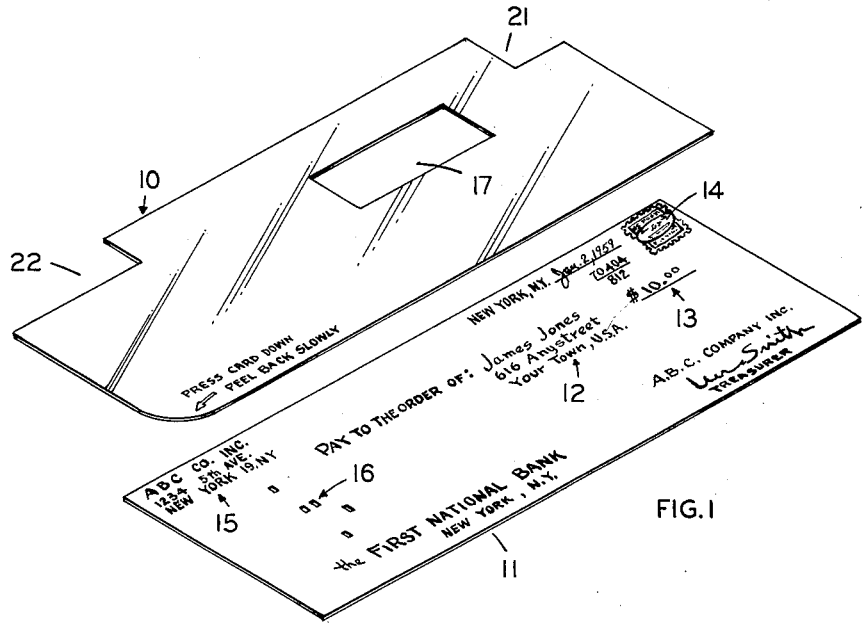
FIG. 1 shows a typical check and sheet of opaque material in spaced relationship prior to placing the two sheets in contact.

With reference now to the drawing and more particularly FIG. 1 thereof, there is illustrated a check 11 spaced from a sheet of covering material 12. The check 11 includes a portion 12 with the name and address of the payee in the center of the check. A portion 13 includes the sum payable. A stamp 14 may be manually or automatically applied. The return address of the payor may be located in the portion 15 at the upper left-hand corner of the check.

If the check is automatically prepared by punched-card type machines, openings such as at 16 will appear in the card. Such automatically prepared checks are generally made of cardboard. However, the invention is still applicable to preserving the confidential aspects of checks and other written material inscribed on a less rigid sheet.

The covering sheet 12 is preferably formed with an opening 7 in the center for exposing the name and address of the payee and cut out corners 21 and 22 for exposing the stamp 14 and return address 15, respectively. It is to be understood that the particular shape of the card 11 and covering sheet 12 may be varied within the principles of the invention. The important factor is that the separate covering sheet be strippably secured to the message-bearing sheet; e.g. the check 11 of FIG. 1, so that the confidential information, such as the amount payable 13, is covered from view while information identifying the intended recipient, such as the name and address of the payee, is exposed to view.

The material 12 is preferably adhesive-backed paper which may be secured firmly to the message-bearing sheet by applying pressure, yet may be easily removed by peeling. It has been found that a suitable material for the sheet 12 is the adhesive-backed paper manufactured by the Avery Adhesive Corporation of Moravia, California and sold under the trade name "Kum Kleen."

Figure 2:
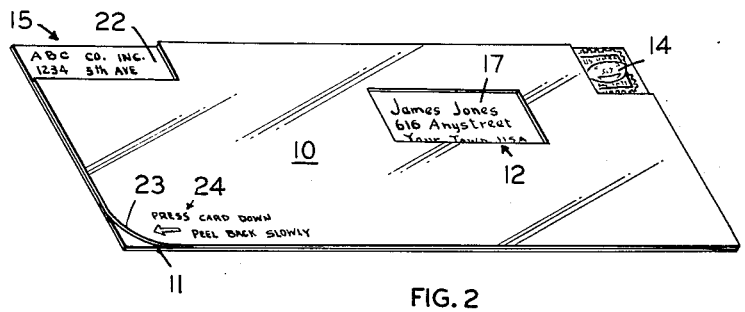
FIG. 2 shows the check and covering sheet in contact to form a unit ready for mailing, and, FIG. 3 shows a portion of the mailed check of FIG. 2 with the rounded corner lifted upward preparatory to peeling off the entire covering strip.
Figure 3:
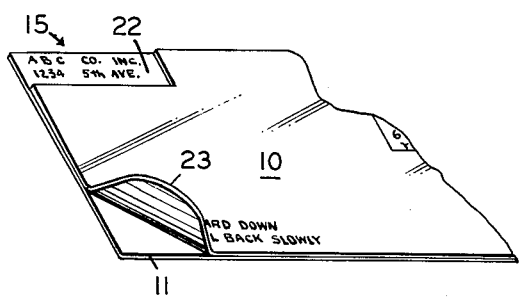

Referring to FIG. 2, the sheet 10 is shown adhesively secured to the check 11 to provide an assembly ready for mailing. It will be observed that the lower left hand corner 23 is rounded to facilitate separating sheets 10 and 11 after delivery of the assembly to the addressee. The instructions 24 direct the recipient to press the card 11 down and peel back the sheet 10 slowly as shown in FIG. 3. This uncovers the check 11 without reducing the legibility of the inscribed material thereon.

The techniquies specifically illustrated in the drawing with respect to mailing a check may be applied to a number of different situations. Confidential information may be transmitted by inscribing this information on a first sheet together with an inscription designating the recipient. A separate second sheet of material is then strippably secured to the first sheet so as to cover the confidential information while exposing the inscription designating the recipient. This assembly may then be mailed through suitable channels and the recipient merely peels off the covering sheets to receive the confidential information.

While the separate second sheet has been specifically described as an adhesive backed sheet, the adhesive material might well be applied only to the edges of the covering sheet, or to portions of the message-bearing sheet. The particular form of adhesive is unimportant so long as removing the covering sheet does not destroy the interpretability of the confidential information. Thus, if the covering sheet 10 were gummed around its peripheral edge with conventional envelope adhesive, the covering sheet could still be stripped from the card without interfering with the interpretability of the material inscribed thereon.

The novel assembly of a covering sheet and message-bearing card strippably secured together provides an exceptionally compact, lightweight device for transmitting a confidential message. Moreover, the method of assembling this package may be performed very easily and quickly by hand or much more rapidly with relatively simple automatic machinery.

For example, the covering sheets 10 might be upon a roll with perforations between successive covering sheets so that an operator could unwind each covering sheet from the roll as needed. Alternatively, the reel of covering sheets might be supported upon an axle and laid over checks or other automatically fed information-bearing cards as the reel is unwound, means being provided for strippably securing a cover sheet to each check thus fed.

There has been described novel methods and means for transmitting confidential information having a number of advantages. Messages transmitted according to the invention are easier to handle because there is less bulk in the units mailed, thereby facilitating pre-punching techniques for designating state, city, and zone to expedite automatic sorting by the post office. The reduced weight per unit enables more messages to be carried per pound, an especially important advantage in connection with transporting mail by air.

The cost of the material per unit is low and the individual units are easier to process when handling a large number. Moreover, the need for costly stuffing machines or expensive manual stuffing is eliminated. Thus, whether the novel method is practiced by hand or machine, cost per handling each unit is reduced.

The significance of even slight cost savings in handling checks alone will be appreciated when it is recognized that the dividend-paying corporation with the largest number of stockholders must send out 1,619,397 dividend checks four times each year to its stockholders of record. There are currently ten billion checks being used each year and by 1970 this amount is expected to reach 22 billion.

The specific embodiment described herein is for the purpose of illustrating the best mode now contemplated for practicing the invention. It is evident that those having ordinary skill in the art may now make numerous modifications of and departures from this specific embodiment and uses described herein without departing from the inventive concepts. Consequently, the invention is to be construed as limited only by the spirit and scope of the appended claim.

What is claimed is:

A check assembly adapted to be mailed as a unit comprising a top sheet strippably secured to an underlying rectangular check comprised of a relatively stiff sheet material, said check containing a centrally located address section and a return address section located at the upper left hand corner of the check, said top sheet being comprised of a relatively thin lightweight opaque sheet material and being of a rectangular shape generally congruent with the check and being strippably secured at its marginal edges upon the check in registry therewith, said top sheet being further provided with a centrally located cutout section in registry with the aforementioned address section of the check and a cutout corner at the upper left hand corner of the top sheet in registry with the aforementioned return address section of the check whereby said address and return address of the check may be viewed while maintaining the remainder of the check underlying the top sheet obscured until the top sheet is stripped therefrom and said top sheet having a rounded lower corner to expose a bottom corner of the check to facilitate the stripping of the top sheet from the check.

References Cited in the file of this patent
UNITED STATES PATENTS

| | | |
|---|---|---|
| 1,946,751 | McCarthy | Feb. 13, 1934 |
| 2,213,666 | Burke | Sept. 3, 1940 |
| 2,274,488 | Kutscher | Feb. 24, 1942 |
| 2,396,221 | Yancey | Mar. 5, 1946 |
| 2,537,732 | Angus | Jan. 9, 1951 |
| 2,831,707 | James et al. | Apr. 22, 1958 |
| 2,985,464 | McFarland | May 23, 1961 |